Jan. 23, 1934.  A. R. KELLER  1,944,742
AGITATOR
Filed Aug. 22, 1932     2 Sheets-Sheet 1

ANDREAS R. KELLER
INVENTOR.

BY Erich H. Michaelis
ATTORNEY.

Jan. 23, 1934.   A. R. KELLER   1,944,742
AGITATOR
Filed Aug. 22, 1932   2 Sheets-Sheet 2
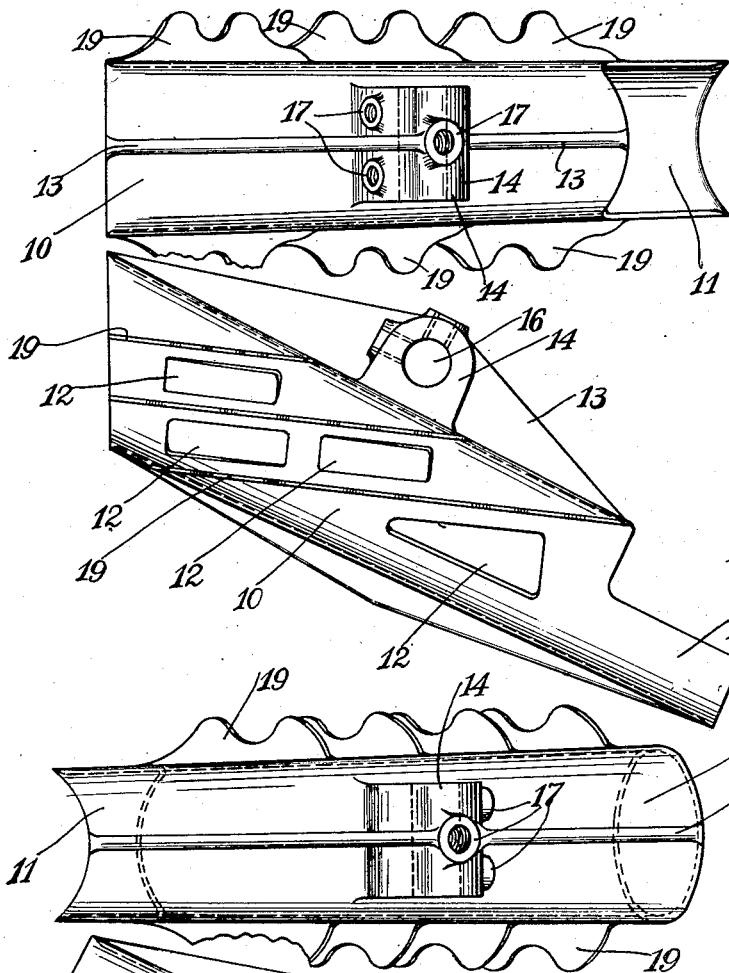
Fig. 3.
Fig. 4.
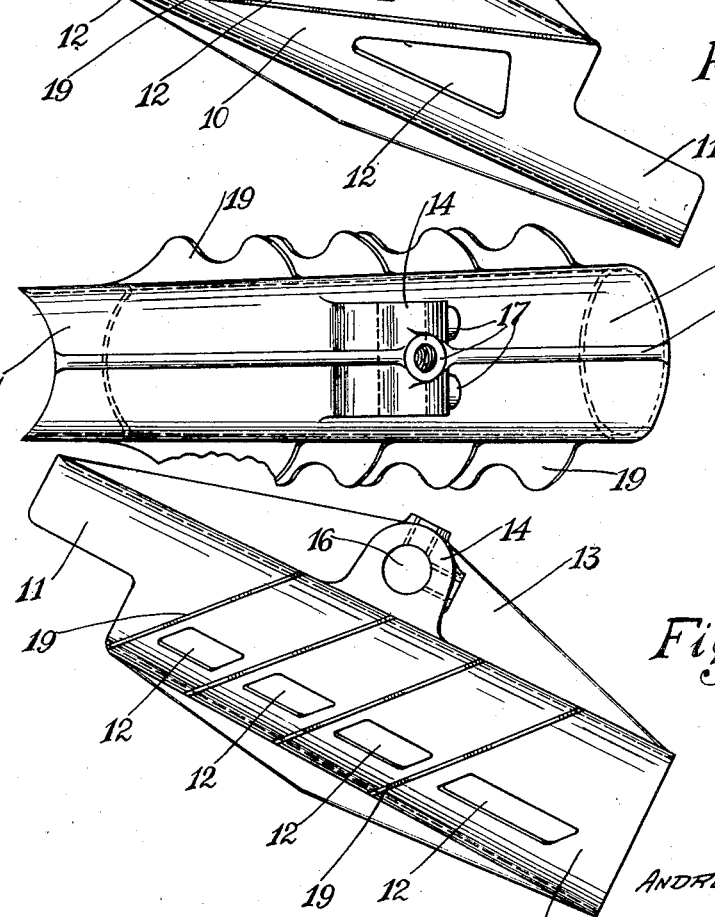
Fig. 5.
Fig. 6.
ANDREAS R. KELLER
INVENTOR
BY Erich H. Michaelis
ATTORNEY Patented Jan. 23, 1934

1,944,742

UNITED STATES PATENT OFFICE 1,944,742

AGITATOR

Andreas R. Keller, Lombard, Ill.

Application August 22, 1932. Serial No. 629,990

1 Claim. (Cl. 259—135)

The invention relates to agitators and more especially to that type of agitators which are adapted to be used to agitate and stir a mash prepared for the purpose of brewing beer or the like.

The object of the invention is to provide a hollow agitator, which by means of its hollow form and by means of centrifugal power will force the heavy mash upwardly, which collects on the bottom of a mash tank or the like.

Another object of the invention is to provide a hollow agitator of conical shape, which is adapted to be fastened in pairs to a spider, which is rotatably mounted in a mash tank, whereby the agitators of one pair will be arranged so, that one of said agitators will scoop up the heavier mash, and force it upwardly through its hollow body so, that said heavier mash will be forced into the thinner liquid in the tank, where the ingredients contained in the heavier mash will be more thoroughly extracted, while the other agitator of said pair will conduct some of the thinner liquid mash downwardly into the layer of the thicker heavier mash.

A still other object of the invention is to provide the hollow conical agitator with circumferential openings to prevent the clogging of the agitators and to equip each agitator with laterally extending leaf-like fins, which arranged so, that in every case, when the agitator is moved through the mash the fins will force the heavier parts of the mash upwardly, mixing it thoroughly with the more liquid part of the mash.

Other objects of the invention not specifically mentioned may be easily ascertained and understood from the following description in connection with the accompanying drawings forming a part thereof. It is however to be understood that the invention is not to be limited or restricted to the exact construction and formation shown in the drawings and described in the specification, but that said invention is only to be limited by the scope of the claim appended hereto.

In the drawings illustrating a preferred embodiment of the invention.

Fig. 3 is a top view of an agitator according to the present invention, which is adapted to scoop up the heavier parts of the mash from the bottom and force these parts upwardly into the thinner liquid portions of the mash.

Fig. 4 is a side view of the agitator shown in Fig. 3.

Fig. 5 is a top view of an agitator adapted to conduct the thinner liquid portion of the mash downwardly into the heavier layer of mash, and Fig. 6 is a side elevation of Fig. 5.

Figure 1:
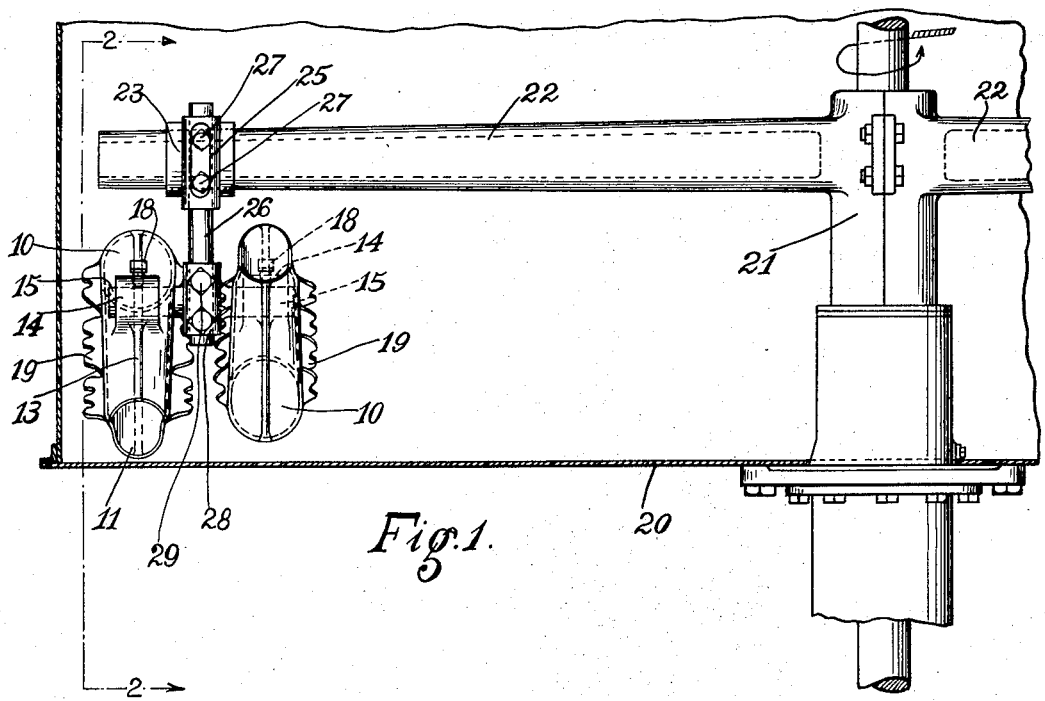
Fig. 1 shows a pair of agitators in working position fastened to an arm of a spider rotatably mounted inside a mash tank.
Figure 2:
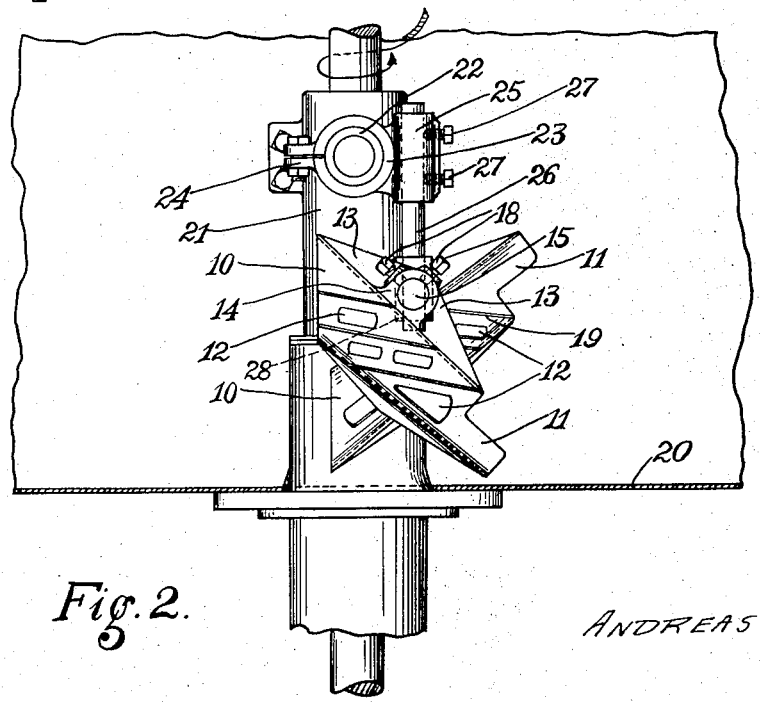
Fig. 2 is a sectional view taken on line 2—2 of Fig. 1.

The agitator according to the present invention is preferably made in one casting. The two agitators, detailed in Figs. 3 and 4, and 5 and 6 respectively, are constructed alike with the one exception, that the one may be called a left hand agitator, while the other is a right hand agitator. Both of these agitators have a hollow conical shaped body 10. The agitator shown in Figs. 3 and 4 has its larger opening on top, while the agitator shown in Figs. 5 and 6 has its larger opening on its lower end. The first-named agitator has at its lower end a scoop-like portion 11. The second agitator is provided with the same part at its upper end. In the side walls of the body 10 the agitator is provided with a plurality of openings 12, which may be of any desired shape and size. On its upper part, the agitator is provided with a rib 13, and on about the center of this rib a hub 14 is formed adapted to receive a short shaft 15 in a hole 16 provided in said hub. In addition to that, the hub has a plurality of tapped holes 17 adapted to receive set screws 18 to secure the agitator in any desired position on said short shaft 15. On the sides of the agitator leaf-like fins 19 are formed, and are arranged at such angles to the horizontal that the heavier thick portion of the mash, will be moved upwardly by these fins, when the agitator is forced through the mash in a mash tank 20. In the mash tank a spider 21 is rotatably mounted having a plurality of spider arms 22. On one of these spider arms, a cross-piece 23 is removably and adjustably fastened by being clamped thereon, as shown at 24 in Fig. 2. This cross-piece has a sleeve 25, adapted to receive a vertical shaft 26 held in position in said sleeve by means of bolts 27. On the lower end of the vertical shaft 26 a second sleeve 28 is fastened by means of bolts 29, and the short shafts 15 mentioned above are formed integrally with this second sleeve 28, so that the agitators may be fastened to the spider arm in the manner shown in Figs. 1 and 2.

When a pair of agitators are fastened to the corresponding short shafts 15 and when the spider in the mash tank is set into rotary movement one of said agitators will scoop up with the portion 11, which is arranged adjacent the bottom, the heavier thicker portions of the mash which will be forced upwardly through the hollow body of the agitator. The conical shape of the agitator provides an outlet for the mash having a bigger diameter than the inlet, thereby preventing the mash from clogging in said agitator. In addition to that, the lateral openings 12 will permit some of the thick mash to leave the interior of the agitator body. This portion of the mash which comes out of the holes 12, will be engaged by the fins 19, and will be driven upwardly by them into the thinner liquid.

The other agitator of the pair will scoop up some of the liquid in the other portions of the mash, and will force said liquid downwardly by its rotary motion, so that the two agitators forming a pair will cooperate and effect a very thorough mixing and stirring of the mash.

Having described my invention and how the same is to be performed, I claim as new and desire to secure by Letters Patent:

The combination of a tank, a spider rotatably mounted in said tank, and a plurality of agitators, each agitator having a hollow, conical body open on both ends and provided at its smaller end with a scoop-like prolongation, the agitators being arranged on the arms of the spider in pairs and in an inclined position, the scoop-like prolongation of one agitator of each pair extending upwardly and the prolongation of the other agitator of each pair extending downwardly, all prolongations extending forwardly in the direction of rotation of the spider and being adapted to force contents of the tank into the hollow body of the agitator.

ANDREAS R. KELLER.